July 20, 1954 A. J. JAHNCKE 2,684,248

RECORD PLAYER WITH AN AUTOMATIC RECORD CHANGER

Filed April 14, 1949 8 Sheets-Sheet 1

Inventor:
Albert J. Jahncke
By Robert E. Burns
Attorney

July 20, 1954 A. J. JAHNCKE 2,684,248

RECORD PLAYER WITH AN AUTOMATIC RECORD CHANGER

Filed April 14, 1949 8 Sheets-Sheet 2

Inventor:
Albert J. Jahncke
By Robert E. Burns
Attorney

RECORD PLAYER WITH AN AUTOMATIC RECORD CHANGER

Filed April 14, 1949 8 Sheets-Sheet 3

Inventor:
Albert J. Jahncke
By Robert E. Burns
Attorney

RECORD PLAYER WITH AN AUTOMATIC RECORD CHANGER

Filed April 14, 1949 8 Sheets-Sheet 4

Inventor:
Albert J. Jahncke
By Robert E. Burns
Attorney

RECORD PLAYER WITH AN AUTOMATIC RECORD CHANGER

Filed April 14, 1949 8 Sheets-Sheet 5

Inventor:
Albert J. Jahncke
By Robert E. Burns
Attorney

Inventor:
Albert J. Jahncke
By Robert E. Burns
Attorney

Inventor:
Albert J. Jahncke
By Robert E. Burns
Attorney

Inventor:
Albert J. Jahncke
By Robert E. Burns
Attorney

Patented July 20, 1954 2,684,248

UNITED STATES PATENT OFFICE 2,684,248

RECORD PLAYER WITH AN AUTOMATIC RECORD CHANGER

Albert John Jahncke, Crissier-Renens, Switzerland, assignor to Hermann Thorens Societe Anonyme, Sainte Croix, Switzerland, a firm of Switzerland Application April 14, 1949, Serial No. 87,442

Claims priority, application Switzerland April 16, 1948

4 Claims. (Cl. 274—10)

The present invention relates to a record player with an automatic record changer. The term "record player" is used broadly to include phonographs as well as record playing apparatus of radio-phonograph combinations, public address systems, telephone or radio broadcasting systems and other sound reproducing arrangements. In particular, the invention relates to a record player in which a stack of records in reserve rest above the turntable on a support surface presented by a shaft passing through the center holes of the records, the stack of records in reserve being held in place on the support surface by a record pressing table which fits on the said central shaft. In accordance with the invention, the record pressing table comprises a device intended to block the pick-up in its outgoing travel, when the last record of the stack in reserve has been played. This blocking of the pick-up effects the stopping of the motor of the record player.

The accompanying drawings represent, by way of example, a mode of execution of the record player which is the object of the invention.

Figure 1:
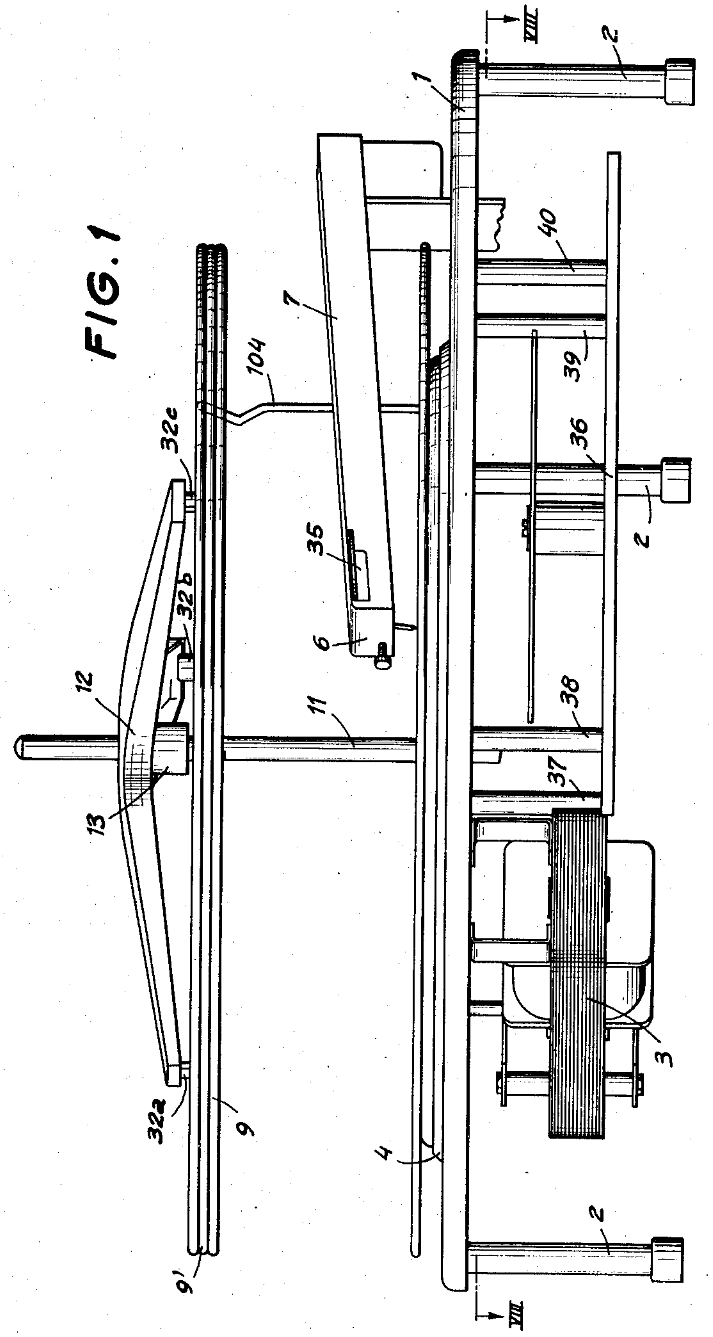
Fig. 1 is a general view in front elevation of the record player.

In the drawings, there is shown a record player having a base plate 1 resting on feet 2 and under which there is mounted a motor 3 which drives the turntable 4 by means of a friction driving wheel 5, the rim of which is provided with a rubber tire and is held elastically against the inner side of the rim 4′ of the turntable. A pick-up 6 is carried by an arm 7, pivoted around an axis 8 which can be oblique to the vertical in such a way that at least a part of its outgoing travel to bring the pick-up to the outside of the record periphery at the end of each playing is effected under the influence of gravity.

9 designates a record from a stack of records in reserve resting above the turntable 4 on the horizontal support surface 10 of a straight shaft 11 passing through the center holes of the records in line with the axis of the turntable 4. The reserve records 9 are held horizontally on the support surface 10 by a record pressing table 12 in the form of a three-armed star having a hub 13 slidable on the upper end of the record-carrying shaft 11.

Figures 6, 7, 11, 12:
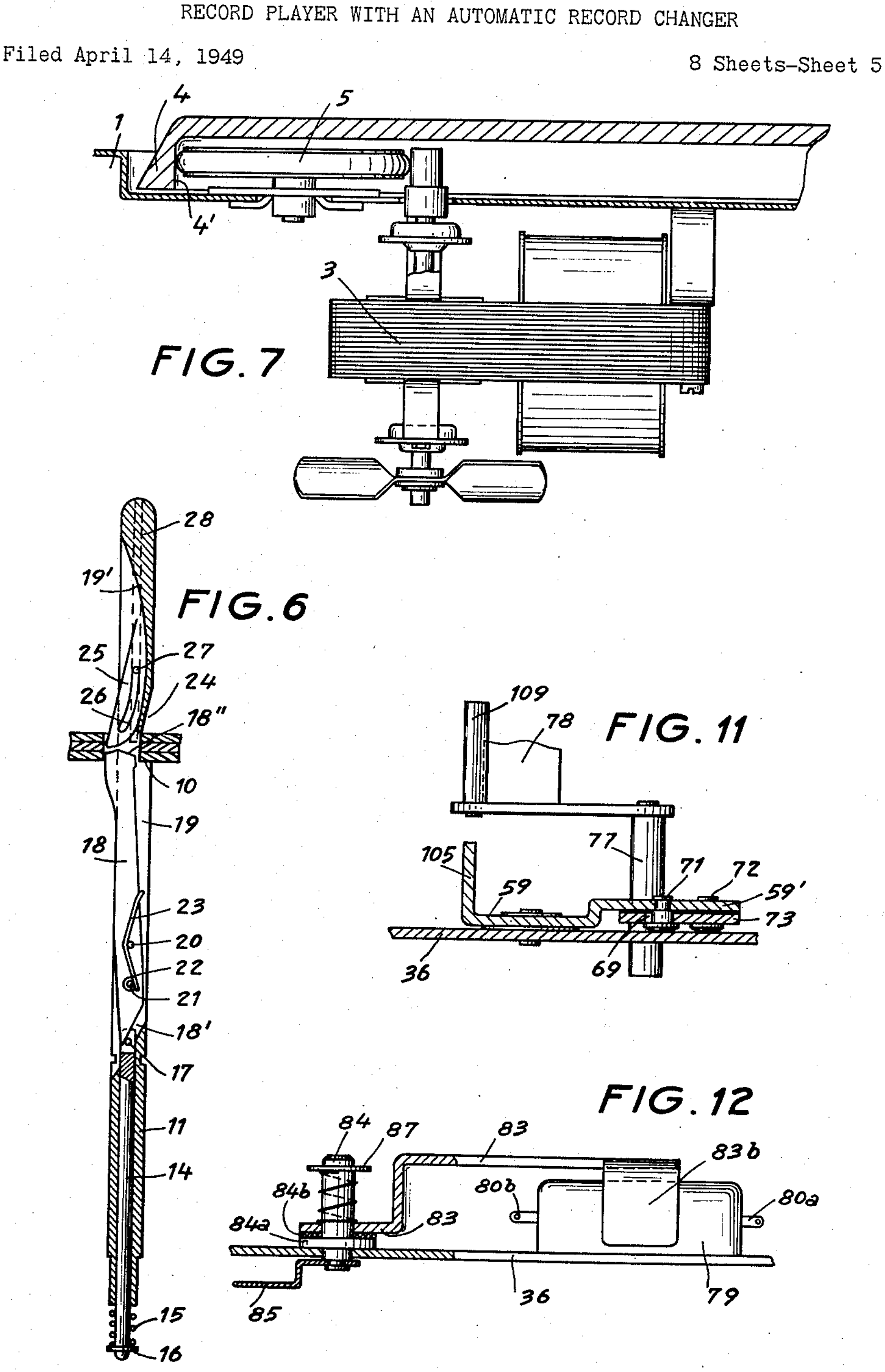
Fig. 6 is an axial section through the record-carrying shaft.
Fig. 7 is a front elevation with parts in section through the drive device of the turntable.
Fig. 11 is a section on line XI—XI of Fig. 8.
Fig. 12 is a section on line XII—XII of Fig. 8.
Figure 8:
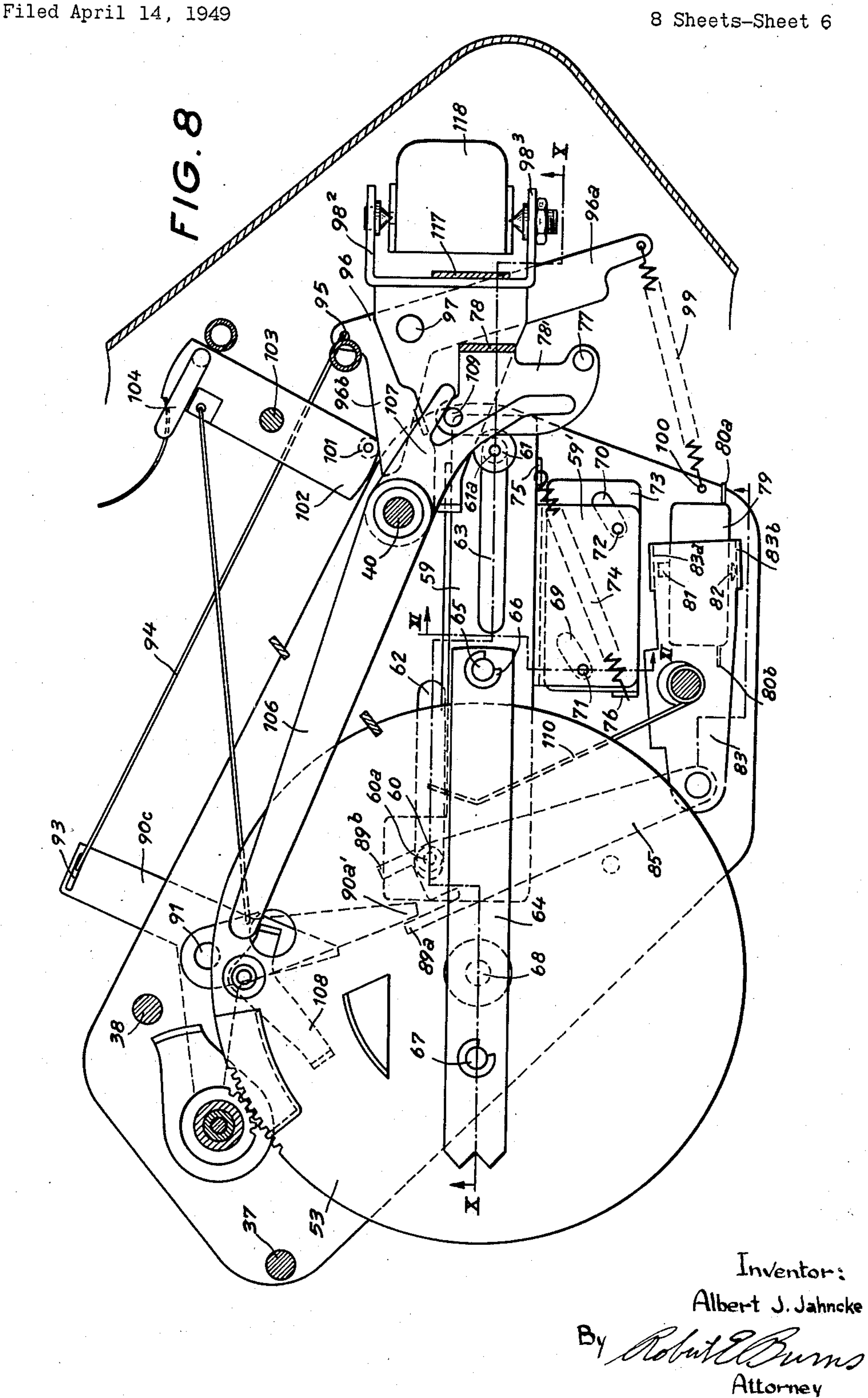
Fig. 8 is a plan view of the assembled mechanism of the record player on the line VIII—VIII in Fig. 1.

The record-carrying shaft (illustrated in section in Fig. 6) has a hollow lower end in which there is mounted a lifter rod 14, capable of sliding axially against the action of a coil spring 15 which is mounted on the lower end of the lifter rod projecting from the shaft 11, and acts between a collar 16 and the end of the shaft 11. The spring 15 tends to move the lifter rod 14 downwardly. The upper end of the lifter rod 14 carries a transverse pin in contact with an inclined plane 18′, which is presented by the lower end of a lever 18 lodged in a diametric longitudinal slit 19 in the shaft 11, and pivoted around a pin 20 fixed in the shaft 11. The angular displacement of the lever 18 is limited by another pin 21, fixed in the walls of the slit 19 and engaged in a hole 22 of the lever 18. A pin spring 23 tends to hold the lever 18 in the position illustrated in Fig. 6, in which its upper end, the terminal surface 18″ of which is located above the supporting surface 10 on which the lower record 9 of the stack of records in reserve rests, is disengaged from this supporting surface and projects from the shaft 11 on the opposite side of the shaft from said surface 10. This prevents the dropping of the first record of the stack. The longitudinal slit 19 extends above the supporting surface 10 which is formed by a notch 24 in the shaft 11, but the upper part of the slit extends only part way through the shaft, its back 19' being arched and forming a gliding surface of a small slider 25 in the form of a circular segment lodged in this upper part of the slit 19. The slider 25 is connected with the shaft 11 by a transverse pin 27 which is fixed in the shaft and extends through a longitudinal slit 26 in the member 25. In its lower position illustrated in Fig. 6, the lower end of the small slider 25 emerges from the shaft 11 at the opposite side of the supporting surface 10 and holds the next to the last record $9^1$ of the reserve stack against any lateral displacement when, under the action of the delivery mechanism, the lifter 14 acting from the bottom upwards through its pin 17 on the inclined plane 18' of the lever 18, forces the latter to pivot clockwise in order to push the lower record 9 of the stack out of engagement with the supporting surface 10 in order to allow it to descend to the turntable 4. When the pile of records is completely discharged, the records can be removed from the shaft 11 or be raised up again into the position of reserve, upward movement of the records being permitted by the swing of the lever 18 into the slot 19 and by the movement of the small slider 25 by sliding upwards on the arched back 19' of the slot 19. The shape of the slider and slots is such that upward movement of the slider 25 causes it to be retracted into the shaft.

Figure 4:
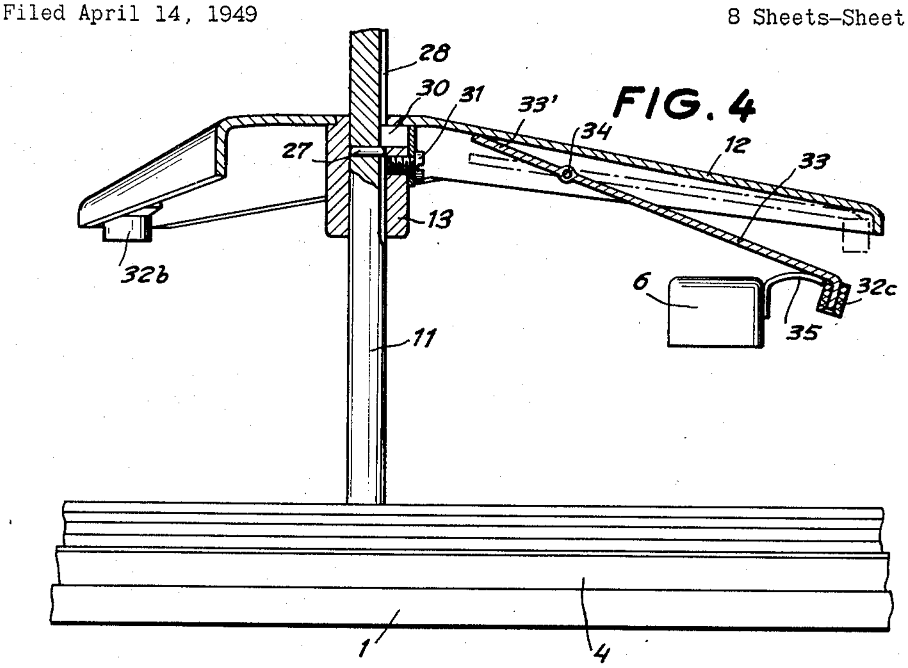
Fig. 4 is a section through the blocking device of the pick-up at the end of the stack of records, being taken approximately on the line IV—IV in Fig. 2.
Figure 5:
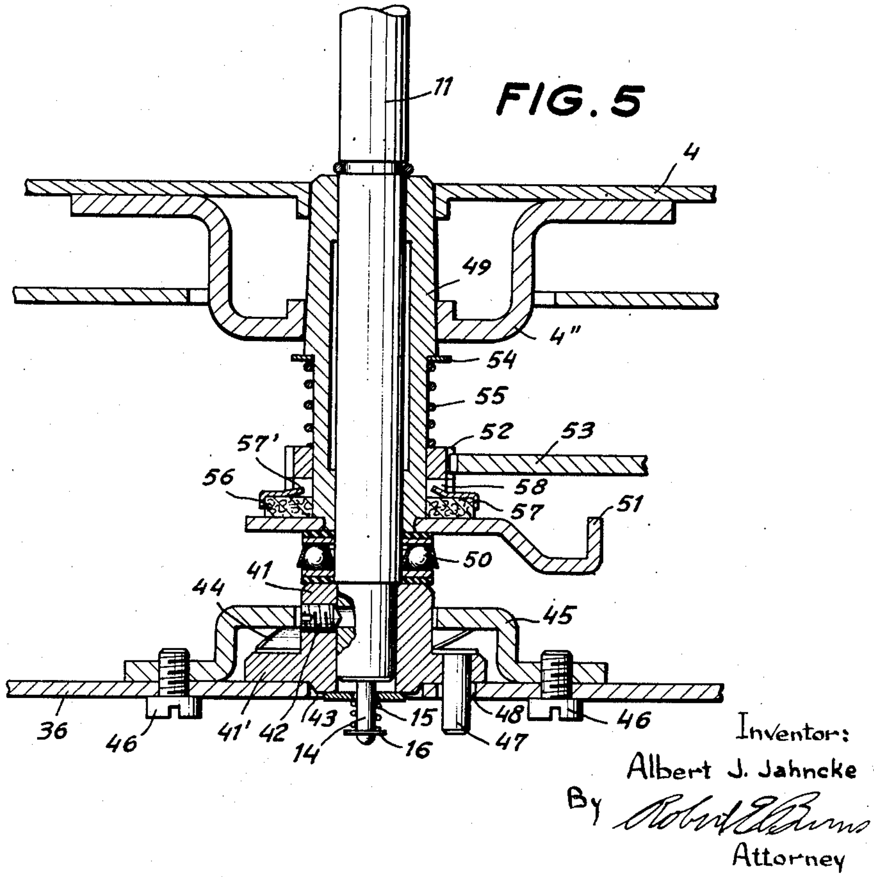
Fig. 5 is an axial section through the supporting device of the record-carrying shaft on an enlarged scale.

The upper end of the shaft 11 has still another longitudinal slot 28, perpendicular to the slot 19, and in which the end of the pin 27 is made to project in order to serve as stop limiting the descent of the record pressing table 12, when the stack of records in reserve 9 is completely discharged. The plate 12 is connected through its hub 13 with the upper end of the shaft 11. A key 30 held in the hub 13 by a screw 31 engages in the slot 28 of the shaft 11 and thus not only joins the record presser 12 with this shaft angularly but also limits the descent of the record presser 12 by coming into abutment with the pin 27, when the last record of reserve has left the supporting surface 10. The record pressing plate 12 rests on the reserve records by means of three rubber cushions $32^a$, $32^b$, $32^c$, the first two of which are attached at the ends of two of its arms, while the third, $32^c$, is attached at the end of a lever 33 pivoted on a pin 34 extending transversely between downwardly projecting side flanges of one arm of the plate 12. The lever 33 can pivot freely on the pin 34, but its angular displacement is limited by its inner end 33' which, when the lever is free to fall as a result of the descent of the last record of the stack, comes to abut against the lower side of the corresponding arm of the plate 12, as illustrated in Fig. 4. When the lever 33 has dropped, at the end of the stack, its rubber cushion $32^c$ is disposed in the path which the pick-up 6 is supposed to pass through after the playing of the last record. The pick-up 6 has a lateral lobe or projection 35 which is adapted to abut against the cushion $32^c$. Since the record pressing plate 12 is joined angularly with the shaft 11 which, as will be explained further on, can turn only under the action of a relatively high torque that can only be applied to it manually, the pick-up is thus blocked in its outgoing travel at the end of the stack by the cushion $32^c$ of the lever 33. In order to block the pick-up, the arm of the record pressing plate 12 which carries the lever 33 should be in the angular position illustrated in full lines in Fig. 2, the position which it occupies during the entire running of the machine. In order to disconnect the pick-up out of the range of the records, it is sufficient to turn the plate 12 clockwise in order to bring it into the position illustrated by dotted lines in Fig. 2, which is the position of the machine at rest.

The shaft 11 is mounted elastically on a platform 36 attached to the base 1 through four columns 37, 38, 39 and 40. It carries on its lower end a collar 41 attached by two screws 42 and having an angular flange 41' through which the shaft rests on the edges of a hole 43 cut into the platform 36. The flange 41' is supported against this platform by means of a spring washer 44 resting against a flange 45 attached to the platform 36 by two screws 46. This suspending arrangement of the shaft 11 permits it to bend at a certain angle, for example under the influence of a shock, without any damage resulting to it. Moreover, the spring washer 44 has the purpose of creating a friction couple between the flange 41' and the platform 36, powerful enough so that the shaft 11 can be turned only by a rather large force so that it is not possible to make it turn except with the help of the record pressing plate 12 mounted on its upper end and driving it by the key 30 engaged in the slot 28 in the shaft. The pivoting of the shaft 11 is moreover limited angularly by a pin 47 placed in the flange 41' and engaging in an opening 48 in the form of an annular segment in the platform 36. The pin 47 has also another function which consists in controlling a series of levers, which will be explained later.

The turntable 4 is mounted by its hub 4' on an exteriorly conical barrel shaft 49, turning freely on the shaft 11 and supported by a ball bearing 50. The shaft 49 carries a catch 51 riveted on its lower end and holding in place a friction device mounted on the shaft and serving to attach to the said barrel a gear 52 serving to drive the control cam 53 of the cycle of the changer. This friction device comprises a small wheel 54 serving as support for a helical spring 55 intended to force the gear 52 downwards against a small wheel of felt 56 pressed closely into a metallic cup 57 engaging through two spurs 57' in a diametric slot 58 of the gear 52. The small wheel of felt rests on the catch 51. This friction device permits the gear 52 to turn with a certain frictional force on the barrel 49, thus avoiding the jerks due to the inertia of the plate 4 loaded with records at the time the motor stops at the end of the stack of records in reserve. This friction is necessary by reason of the fact that the stopping device of the pick-up arm works when the motor is still under tension. Moreover, even after the current is cut, the turntable would continue, owing to its inertia, to operate the mechanism if this friction was not existant.

The mechanism controlling the automatic stopping of the motor when all the records in reserve have been played, and the starting up of the machine for a new series of hearings comprises the following parts illustrated in Figures 8 to 12. A lever 59 slides longitudinally on the platform 36 by virtue of the engagement of two rollers 60 and 61 turning on corresponding pins $60^a$ and $61^a$ affixed to the lever 59 and to the platform 36 respectively, in longitudinal slots 62 and 63 cut into the platform 36 and the lever 59 respectively. The sliding lever 59 is controlled by a connecting rod 64, one end of which is pivoted on a pin 65 on the lever 59, on which it is held by a clip 66, and the other end of which is joined to a crankpin 67 carried by the gear cam 53 of the cycle control, turning on an axis 68 attached to the platform 36. The sliding lever 59 comprises a lateral small plate 59' which has two pins 71, 72 engaged in two oblique slots 69 and 70 of a small slide 73. The slide 73 is capable of being displaced transversely of the longitudinal axis of the sliding lever 59. A spring 74 attached to a lobe 75 of the lever 59 and to a lobe 76 of the small slide 73 tends to bring the slide 73 back towards the side of lever 59.

The pick-up arm 7 is pivoted at 114 on two parallel lobes 112³ and 112⁴ of a clamp 112. It is around this horizontal axis 114 that the pick-up arm pivots during the playing of a record in accordance with the irregularities of the surface of this record and the variable lever determined by the successive stacking of records on the turntable 4. The pivoting of the arm 7 in a horizontal plane is around the axis 8 through the intermediary of two screws with conical points 115¹ and 115² attached to two other parallel lobes 112¹ and 112² of the clamp 112 and through a cylindrical projection 116 attached to a bent piece 117. This latter piece is in turn attached to a bent lever 98 pivoting through two parallel lobes 98² and 98³ on a clamp 118 attached to the base plate 1. By acting on the end 98¹ of the lever 98 one can thus cause this lever to pivot towards the right around a horizontal axis 111, carrying with it the vertical axis of pivoting 8 of the arm of the pick-up. A spring 113 attached to the end 78² of an arm 78 joined to the clamp 112 then makes contact with the bottom of the arm of the pick-up 7 and is raised.

A vertical pin 77 attached to the horizontal branch 78' of the arm 78 is disposed in the path which the small slide 73 traverses on 59' and, when it is pushed by the slide 73, the pin 77 causes the pivoting towards the left of the acoustic arm which brings back the pick-up 6 towards the periphery of the records. It is also this pin 77 which, when the pick-up is blocked at the end of the stack by the cushion 32ᶜ of the blocking lever 33, causes the small slide 73 to slide transversely to the lever 59 in opposition to the action of the return spring 74 in order to accomplish a function which will be explained later on. A circuit breaker 79 is inserted into the circuit of the motor 3, the wires of which are attached to the terminals 80ᵃ and 80ᵇ. This circuit breaker comprises two press-buttons 81 and 82, the first producing the opening of the circuit and the stoppage of the motor, the second closing the circuit and the application of current to the motor. A control branch 83 of the circuit breaker 79 is frictionally pivoted on a pin 84 carried by a lever 85. At its free end, the branch 83, which is arranged above the platform 36, has two lobes 83ᵃ and 83ᵇ bent at right angles, intended to act, the first on the button 81 and the second on the button 82 of the circuit breaker 79, depending on the position of the branch. The pin 84 (Figure 12) is riveted to the lever 85 underneath the platform 36 through which it passes freely. It rests on the platform through a bearing 84ᵃ. Between the bearing 84ᵃ and the small branch 83 there is arranged a rubber washer 84ᵇ against which the branch 83 is pressed by a helical spring 86 bearing on a clip 87 pressed closely to the upper end of the pin 84. The connection of the branch 83 with the lever 85 is thus assured by a friction device. The lever 85 has on its free end an opening 88 limited by two arms 89ᵃ and 89ᵇ, between which fits the curved arm 90ᵃ', which forms the end of an arm 90ᵃ, 90ᵇ, 90ᶜ, pivoted on a pin 91 attached under the platform 36. The arm 90ᵇ of this lever 90 has at its free end a notch 92 into which fits the pin 47 of the record-carrying shaft 11. The arm 90ᶜ of the lever 90 has, at its free end, a transverse slot 93 in which fits a hooked end of a strip 94, the other end of which is hooked in a hole 95 of a bent lever 96 pivoted on a pin 97 attached underneath the bent piece 98 which is part of the support of the vertical axis of pivoting of the acoustic arm 7. One of the arms 96ᵃ of the bent lever 96 is held under the action of a spring 99 attached at 100 to the stage 36. The other arm 96ᵇ of the bent lever 96 cooperates with a pin 101 joined to a lever 102 pivoted at 103 by means of a barrel 102ᵃ riveted on 102 and carrying at its other end the selecting shaft 104. This selection device 104, 102, 101 acts through the pin 101 to limit the course of the bent lever 96 depending on whether the record falling from the supporting surface 10 on the turntable 4 is a 12-inch record or a 10-inch record. By means of the bent lever 96, the selection device determines the initial playing position of the pick-up. In fact when it pivots to the right under the action of its spring 99, the bent lever 96 is capable of acting on the pin 77 joined to the bent arm 78 forming the stem of the acoustic arm 7.

The sliding lever 59 has on its side a lobe 105 bent at right angles and comprising an inclined plane 105' intended to cooperate with the curved end 98' of the bent piece 98 in order to effect downward movement of the acoustic arm 7. This movement, as moreover the entire cycle of the changer including the bringing of the reserve record to the turntable 4, is controlled by the cam 53 rotated by the gear 52 at the end of the playing of each record.

The functioning of the record player with automatic record changes, which has just been described, is as follows:

Supposing the record player is in the process of playing a record, for example the eighth of a series of ten records, the last two of which are still resting on the supporting surface 10 of the shaft 11. At the end of the playing of this eighth record, the fast-thread groove of this record imparts a sudden motion towards the center to the pick-up and acts through the automatic connecting mechanism, which has been mentioned and of which the catch 51 is a part, to cause the connection of the cam 53 with the gear 52. The cam 53, acting by means of the connecting rod 64 on the sliding lever 59, pushes the latter towards the support of the acoustic arm 7. The inclined plane 105' of the lobe 105 of the lever 59 acts on the curved end 98' of the bent piece 98 joined to the support of the vertical axis of pivoting 8 of the arm, the support in turn being pivoted around the horizontal axis 111. The pick-up 6 is thus raised from the record which has just been played. Simultaneously the sliding lever 59 pushes, through the small slide 73, against the end of the pin 77 joined to the bent arm 78 forming the stem of the acoustic arm 7, causing the latter to pivot around the axis 8 which has been inclined. The pick-up leaves the periphery of the records. The cam 53 then acts by means of a lever, not shown, on the lifter 14 which, sliding upwards in the shaft 11, causes the lever 18 to pivot; this frees the ninth record from the supporting surface 10 and allows it to descend on the first eight records resting on the turntable 4. The last record of the reserve stack takes the place of the ninth on the surface 10 where it is held horizontally by the record-pressing plate 12 which rests on it by the three cushions $32^a$, $32^b$ and $32^c$. The cam 53 having accomplished half a turn, the sliding lever 59 is brought back by the connecting rod 64, leaving free the pin 77 which is brought back by the lever 85 returned by the spring 99, while the inclined plane 105' is passed through from top to bottom by the bent piece 98. The pick-up 6 returns therefore to engage the exterior grooves of the ninth record. The initial playing position of the pick-up is determined by the course of the lever 96 limited by the pin 101 of the lever 102 of selection, the shaft 104 of which is activated by the passage by the ninth record, if this record is a 12-inch record, and is left in place, if this record is a 10-inch record. The complete cycle of the changer being accomplished when the cam 53 has completed a turn, this cam is again automatically disconnected from the gear 52 by the above mentioned mechanism, and the pick-up 6 plays the ninth record. At the end of the playing of this ninth record, the same cycle is repeated in its entirety; the pick-up 6 rises, leaves the periphery of the records and returns to engage the exterior grooves of the last record which, in the meantime, has descended on the nine others.

Figure 9:
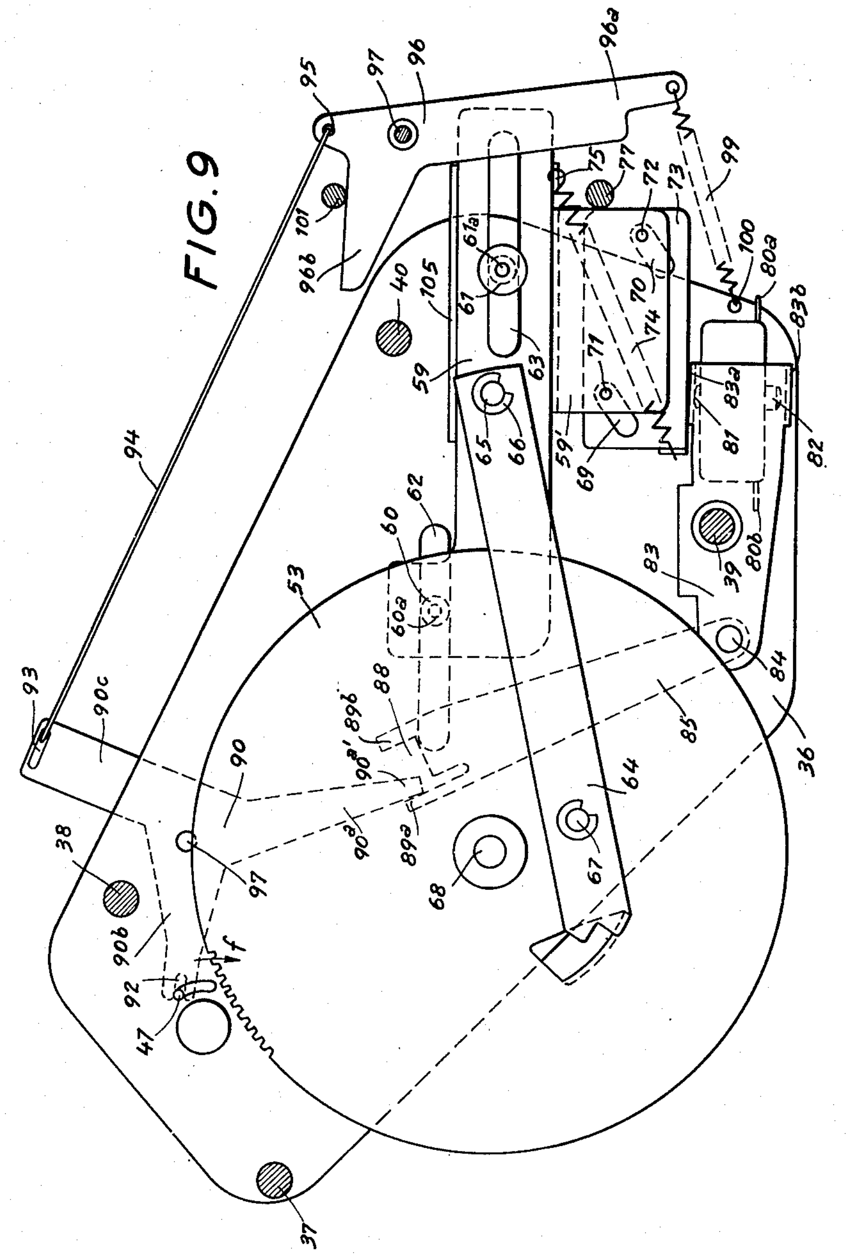
Fig. 9 is a plan view of the stopping mechanism, in the blocking position of the pick-up.
Figure 10:
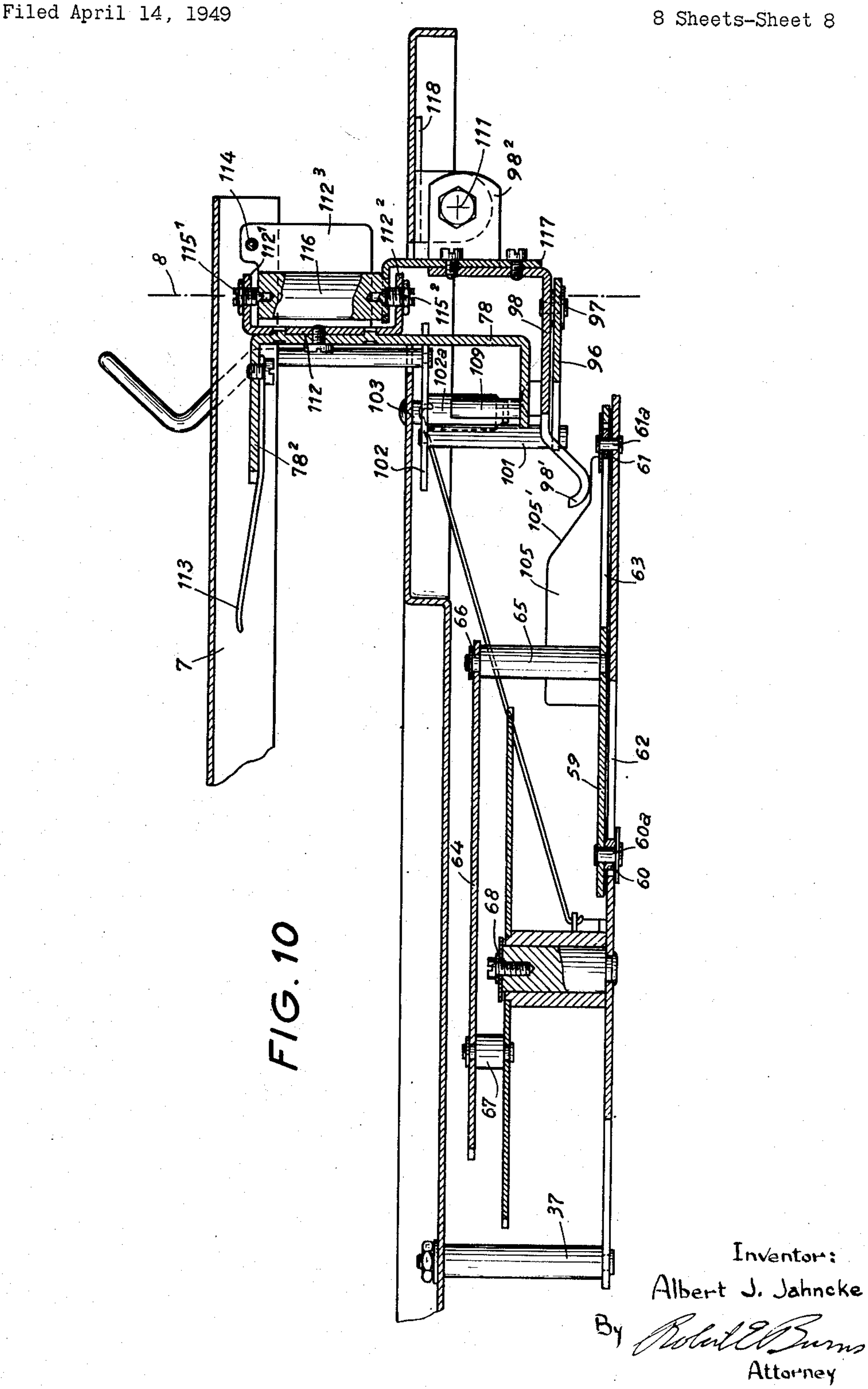
Fig. 10 is a section on the line X—X in Fig. 8.

At the end of the playing of the last record, the cam 53 is again connected on the gear 52 and activated by the connecting rod 64 of the sliding lever 59 acting at the same time on the bent piece 98 by means of its inclined plane 105' on the pin 77 joined to the bent arm 78 by means of the anterior side of the small slide 73. The pick-up 6 rises and starts its usual outward motion, but its lobe 35 comes into abutment with the cushion $32^c$ of the lever 33 carried by the record-pressing plate 12. Because of the descent of the last record, this lever is no longer held up and has fallen into the position illustrated in Figure 4. The pick-up 6 being blocked, the pin 77 which is joined to the acoustic arm is immobilized. But the cam 53 continues to turn, the sliding lever 59 continues to move towards the outside, and the spring 74 yields, the small slide 73, always in contact with the pin 77, is displaced obliquely and comes to activate the lobe $83^a$ of the branch 83 which pivots on the pin 84 and activates the button 81 of the circuit breaker 79, opening the circuit of the motor 3 and stopping the latter. At the moment the current is cut, the turntable 4 continues to turn due to inertia. The cam 53 being immobilized in a position in which it is still with the gear 52, the friction device mounted on the barrel 49 permits the latter to turn a little further in relation to the gear 52 while progressively braking it. Figure 9 shows the different parts of the stopping mechanism at the end of the stack of records in the position which they occupy at the moment when the current has just been cut. The pivoting of the branch 83 towards the right did not activate the lever 85 because of the friction device mounted on the pin 84 and because the arm $90^{a\prime}$ of the arm $90^a$ of the lever in the form of a star 90 is located in the opening 88 of the lever 85, against the arm $89^a$ of this lever, which can be considered stationary at this moment. The pin 47 joined to the record-carrying shaft 11 is located at the left end (in Figures 8 and 9) of the opening 48 in the platform 36, a position corresponding to the operating position of the record player and to the position illustrated in full lines in Figure 2 of the record-pressing plate 12. The pin 47 engaged in the slot 92 of the arm $90^b$ of the star lever 90 has kept this lever in the position illustrated in the Figures 8 and 9.

Figure 2:
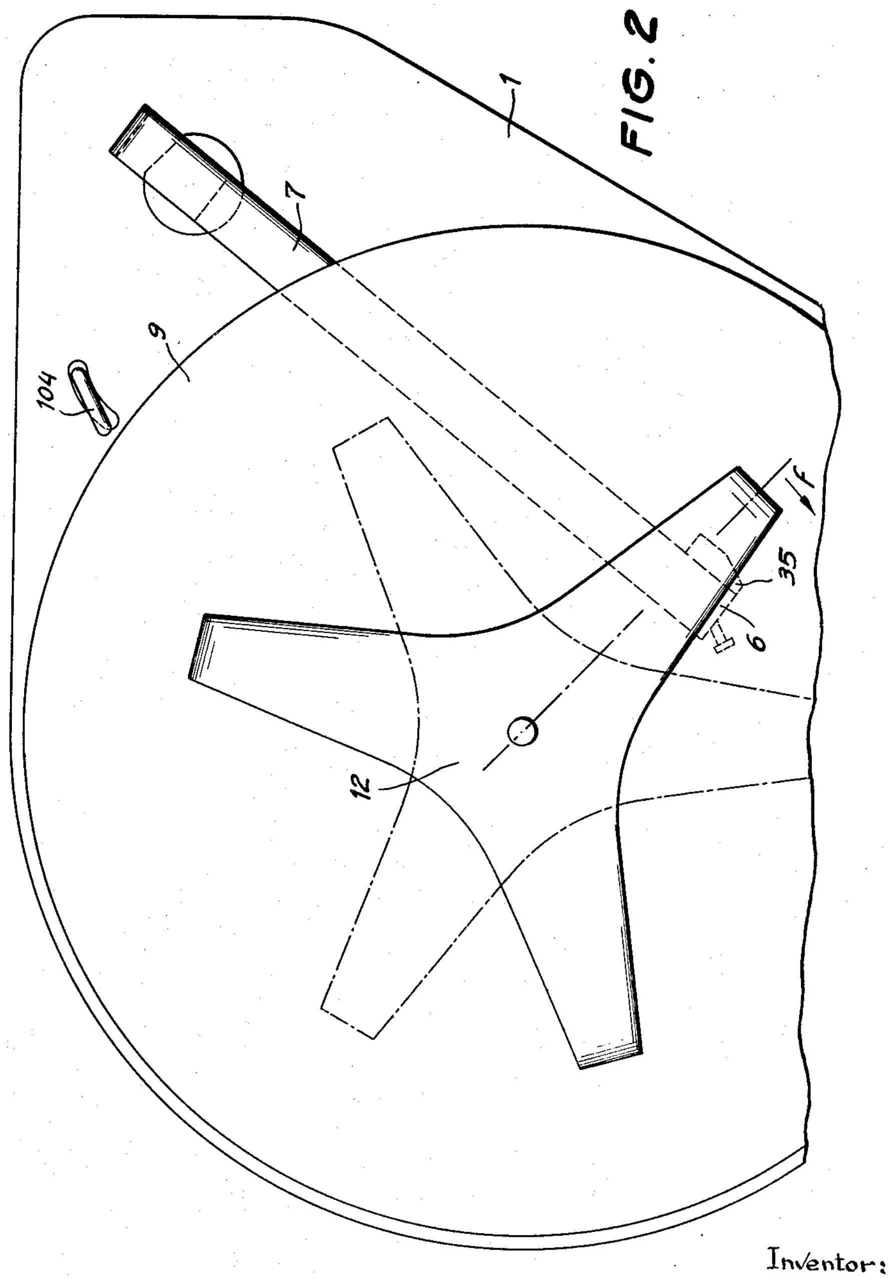
Fig. 2 is a plan view.
Figure 3:
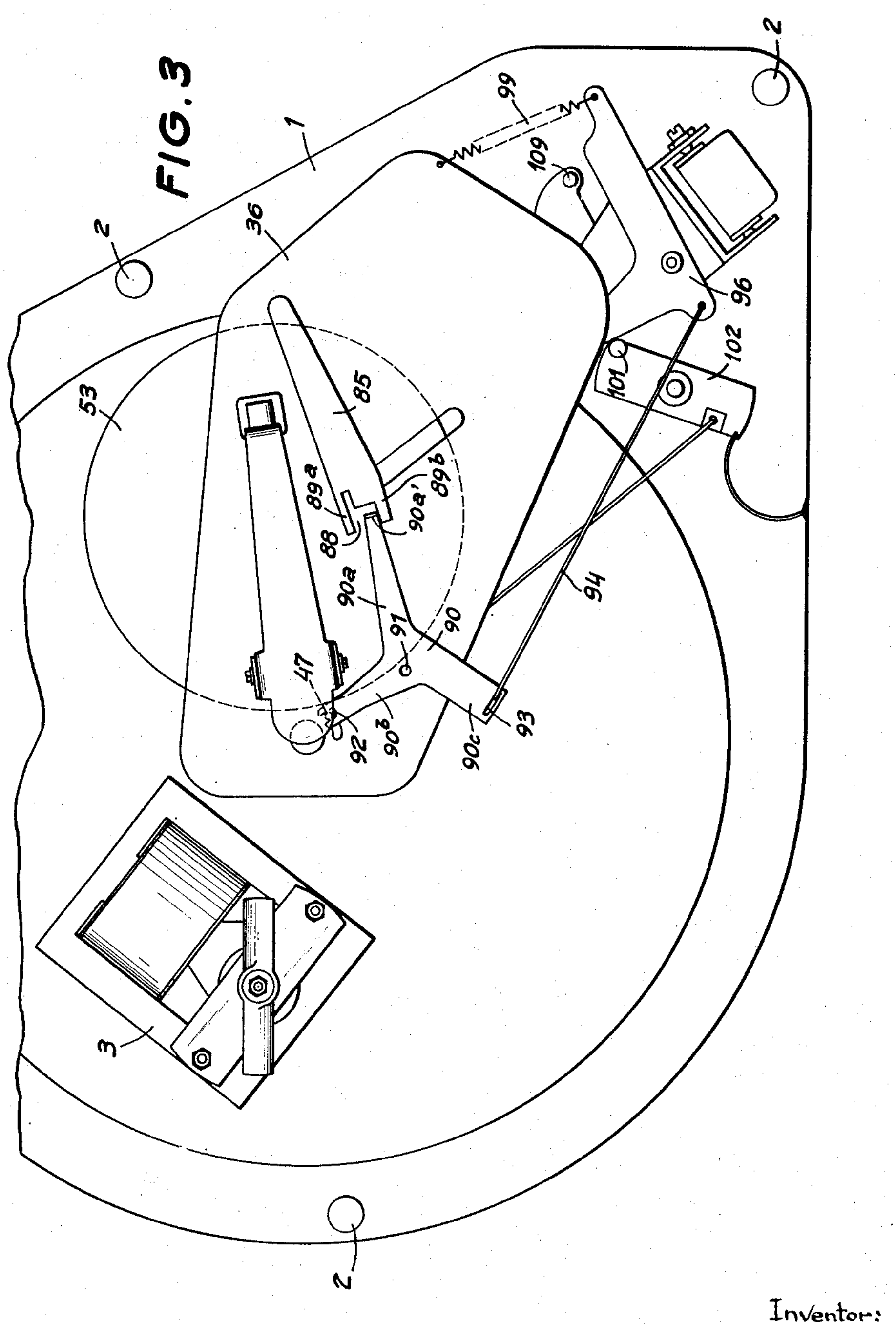
Fig. 3 is a bottom view.

The motor having been stopped, in order to load the record-carrying shaft anew, either by again mounting the records already played, or by placing others on the shaft 11 after having withdrawn the played records, it is first necessary to release the pick-up 6 from the blocking cushion $32^c$ in order to permit the passage of the played records upwards along the shaft 11. In order to release the pick-up which, once it is free, goes by itself to the outside of the periphery of the records, the record-pressing plate 12 is turned by hand in a clock-wise direction as indicated in Figure 2 by the arrow *f*, in order to bring it into the position illustrated by dotted lines in this drawing. By this maneuver the pin 47 joined to the shaft 11, which is rotated by the key 39 of the plate 12, is displaced in the opening 48 in the direction indicated by the arrow *f* in Figure 9 and comes to stop at the right end of this opening. Driven to the left by the pin 47, the star lever 90 exerts a pull by means of its arm $90^c$ on the strip 94, which causes the lever 96 to pivot to the left around 97, and this lever 96 leaves the pin 77 joined to the acoustic arm 7 free to become displaced towards the outside, the slanting of the axis of pivoting 8 of this arm permitting the pick-up to swing out by itself beyond the periphery of the records. This displacement of the pin 77 is moreover favored by the thrust of the small slide 73 which reassumes its position along the side of the sliding lever 59 under the action of its return spring 74. It should be noted that the pivoting of the star lever 90 to the left displaces the arm $90^{a\prime}$ of its arm $90^a$ in the opening 88 of the lever 85 until it engages the arm $89^b$ of this lever. The resulting displacement of the lever 85 to the right does not produce any corresponding displacement of the branch 83 which is already at the end of its movement, but is absorbed by the friction device mounted on the pin 84.

In order to again start the record player after the records have been changed, it is sufficient to turn the plate 12 by hand in a counterclockwise direction to the position illustrated in full lines in Figure 2. This rotation of the plate 12 brings back the pin 47 to the left end of the opening 48 into the position illustrated in Figure 9.

The arm $90^{a\prime}$ of the arm $90^a$ of the star lever 90 is displaced by this rotation in the opening 88 of the lever 85 and has pushed the arm $89^a$, thus causing this lever 85 to pivot to the left. Because of the friction mounted on the pin 84, this rotation is transmitted to the branch 83, the lobe $83^b$ of which presses on the button 82 of the circuit breaker 79, closing the circuit of the motor 3 and putting the motor into operation. The motor drives the turntable 4 through the friction driving wheel 5 and the table 4 drives the barrel 49 and the gear 52 which enmeshes with the cam 53. This activates the lifter rod 14 which causes the record to be played to descend onto the turntable 4, and, through the connecting rod 64, it activates the sliding lever 59 at the same time. This lever is displaced first to the outside, pushing the pin 77 joined to the acoustic arm back to the outside, so that the pick-up does not obstruct the descent of the record. In its movement, the pin 77 drives the bent lever 96 which by pivoting to the left, displaces the strip 94 through its curved end at 95, the other end of the said strip being displaced in the slot 93 of the arm $90^c$ of the star lever 90. The lever 59 is then displaced towards the inside. The rotation of the pin 47 to the left produces a rotation to the right of the star lever 90, the arm $90^c$ of which no longer pulls on the strip 94. The bent lever 96, returned by the spring 99, pivots to the right and pushes the pin 77 joined to the acoustic arm towards the inside until the arm $96^b$ of the said lever 96 comes into engagement with the pin 101 of the selecting lever 102 which limits its course and determines the initial position of play of the pick-up depending on whether the record which has just descended on the turntable 4 is a 10 or 12-inch record.

It will be noted that the mechanism described above, producing the stopping of the motor automatically at the end of the stack of records, could be activated manually in order to stop the motor and consequently the machine at no matter what moment, whether there are still records in reserve on the shaft 11 or whether there are not. In order to do this, it is necessary only to turn the record-pressing plate 12 by hand in the direction of the arrow *f* (Figure 2). By this rotation, the pin 47 which, when the machine is running, is always in the position represented in Figure 9 at the left end of the opening 48, is displaced in this opening to its right end following the arrow *f*, and drives the star lever 90 to the left. The arm $90^{a'}$ of this latter acts on the arm $89^b$ of the lever 85 making the latter pivot to the right. The rotation of the lever 85 is transmitted to the branch 83 which pivots to the right, pressing by means of its lobe $83^a$ on the button 81 of the circuit breaker which cuts the current of the motor. By means of the strip 94, the rotation of the star lever 90 also produces the rotation of the lever 96 to the left against the action of its spring 99. The pin 77 of the acoustic arm remains in the position which it occupies at the moment of the maneuver of the plate 12 and the pick-up therefore remains also in the position which it occupies at that moment.

What I claim and desire to secure by Letters Patent is:

1. In a talking machine with automatic record changer comprising a frame, a pick-up arm pivotally mounted on said frame, so as to be able to effect horizontal and vertical displacements, a pick-up head secured at the free extremity of said pick-up arm, a turntable, a motor for driving said turntable, a shaft extending upwardly from the centre of the turntable, a supporting surface for a stack of reserve records associated with said shaft above the turntable, cam and lever means to operate and outward displacement of said pick-up arm from the centre to the periphery of the turntable at the end of the reproduction of each record, in combination, a spring urged member inserted between said cam and lever means and said pick-up arm, said spring being dimensioned to transmit without extension the force necessary to said outward displacement when the pick-up arm is free to move, a record pressing means slidingly mounted on the upper part of the shaft and intended to maintain the records substantially perpendicular to said shaft, an out of balance arm hingedly mounted on said record pressing means and extending beyond the supporting surface above the record stack, the free extremity of said arm being adapted to rest on the uppermost record of the stack, said arm oscillating about a substantially horizontal axis between an upper angular position, when there is at least one record of reserve on the supporting surface and a lower angular position when there are no records on said supporting surface, and a stop member at said free extremity of the movable arm, said stop member being situated, for the lower angular position of the movable arm, in the way of the pick-up arm in its outward displacement, to stop said outward displacement, said spring urged member being displaced by said cam and lever means against the action of its spring when the pick-up arm is stopped by said stop member during its outward displacement, and a circuit breaker for the motor which is arranged so as to be actuated by the displacement of said spring urged member against the action of its spring to switch out the motor of the talking machine.

2. In a talking machine with automatic record changer comprising a frame, a pick-up arm pivotally mounted on said frame so as to be able to effect horizontal and vertical displacements, a pick-up head secured at the free extremity of said pick-up arm, a turntable, a motor for driving said turntable, a shaft extending upwardly from the centre of the turntable, a supporting surface for a stack of reserve records associated with said shaft above the turntable, cam and lever means to operate an outward displacement of said pick-up arm from the centre to the periphery of the turntable at the end of the reproduction of each record, in combination, record pressing means slidingly mounted on the upper part of the shaft and intended to maintain the record substantially perpendicular to said shaft, the feature that said shaft is angularly movable between two definite angular positions, the shaft being brought into its two definite angular positions by manual rotation of said record pressing means keyed thereon, an out of balance arm hingedly mounted on said record pressing means and extending beyond the supporting surface above the record stack, the free extremity of said arm being adapted to rest on the uppermost record of the stack, said arm oscillating about a substantially horizontal axis between an upper angular position, when there is at least one record of reserve on the supporting surface and a lower angular position when there are no records on said supporting surface, and a stop member at said free extremity of the movable arm, said stop member being situated, for the lower angular position of the movable arm, in the way of the pick-up arm in its outward displacement, to stop said outward displacement, said stop member being situated out of the path of the pick-up for the second definite angular position of the pressing means so as to allow to disengage the pick-up arm from the stop member by manual rotation of said record pressing means.

3. In a talking machine according to claim 2, a spring urged member through which said cam and lever means controls the outward displacement of said pick-up arm, said spring being dimensioned to transmit without extension the force necessary to said outward displacement when the pick-up arm is free to move, said spring urged member being displaced by said cam and lever means against the action of its spring when the pick-up arm is stopped by said stop member during its outward displacement, and a circuit-breaker which is actuated by the displacement of said spring urged member against the action of its spring to switch out the motor of the talking machine.

4. In a talking machine according to claim 2, a circuit breaker for the circuit of the motor, lever means controlling the closing and opening of said circuit breaker through the angular displacement of the centering shaft, said circuit breaker closing the circuit of the motor for the first definite angular position of the pressing means and opening said circuit for the second definite angular position of the pressing means.

References Cited in the file of this patent

UNITED STATES PATENTS

| Number | Name | Date |
|---|---|---|
| 2,017,898 | Gates | Oct. 22, 1935 |
| 2,270,995 | Compare | Jan. 27, 1942 |